United States Patent
Begeja et al.

(10) Patent No.: US 8,189,783 B1
(45) Date of Patent: May 29, 2012

(54) SYSTEMS, METHODS, AND PROGRAMS FOR DETECTING UNAUTHORIZED USE OF MOBILE COMMUNICATION DEVICES OR SYSTEMS

(75) Inventors: Lee Begeja, Gillette, NJ (US); Sarangarajan Parthasarathy, New Providence, NJ (US); Benjamin J Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1165 days.

(21) Appl. No.: 11/312,401

(22) Filed: Dec. 21, 2005

(51) Int. Cl.
*G06F 21/00* (2006.01)
(52) U.S. Cl. ....................................... 380/247
(58) Field of Classification Search ............... 380/247
See application file for complete search history.

(56) References Cited

U.S. PATENT DOCUMENTS

| | | | | |
|---|---|---|---|---|
| 5,166,971 A * | 11/1992 | Vollert | ............... | 379/88.02 |
| 5,197,113 A * | 3/1993 | Mumolo | ............... | 704/200 |
| 5,717,743 A * | 2/1998 | McMahan et al. | ............... | 379/188 |
| 5,845,047 A * | 12/1998 | Fukada et al. | ............... | 704/268 |
| 6,181,780 B1 * | 1/2001 | Finnigan | ............... | 379/67.1 |
| 6,233,556 B1 * | 5/2001 | Teunen et al. | ............... | 704/250 |
| 6,389,397 B1 * | 5/2002 | Otto | ............... | 704/270 |
| 6,404,859 B1 * | 6/2002 | Hasan | ............... | 379/88.04 |
| 6,650,737 B2 * | 11/2003 | Finnigan | ............... | 379/88.02 |
| 7,023,966 B2 * | 4/2006 | Finnigan | ............... | 379/88.02 |
| 7,035,386 B1 * | 4/2006 | Susen et al. | ............... | 379/93.02 |
| 7,212,613 B2 * | 5/2007 | Kim et al. | ............... | 379/88.02 |
| 7,360,694 B2 * | 4/2008 | Wankmueller | ............... | 235/382 |
| 7,403,766 B2 * | 7/2008 | Hodge | ............... | 455/411 |
| 2001/0048745 A1 * | 12/2001 | Sheymov et al. | ............... | 380/247 |
| 2003/0046083 A1 * | 3/2003 | Devinney et al. | ............... | 704/273 |
| 2005/0041671 A1 * | 2/2005 | Ikeda et al. | ............... | 370/395.52 |
| 2005/0273333 A1 * | 12/2005 | Morin et al. | ............... | 704/247 |
| 2006/0222210 A1 * | 10/2006 | Sundaram | ............... | 382/115 |

* cited by examiner

*Primary Examiner* — Michael S McNally

(57) ABSTRACT

Systems, methods, and programs for generating an authorized user profile for a mobile communication device, may sample an audio stream generated by the mobile communication device during communication and may store the audio sample. The systems methods and programs may determine an audio characteristic of the stored audio sample and may create the authorized user profile based on the audio characteristic. Systems, methods, and programs for detecting unauthorized use of a mobile communication device may sample an audio stream generated by the device during communication, may determine an audio characteristic of the audio sample, and may compare the determined audio characteristics of the sample with an authorized user profile.

8 Claims, 4 Drawing Sheets

US 8,189,783 B1

SYSTEMS, METHODS, AND PROGRAMS FOR DETECTING UNAUTHORIZED USE OF MOBILE COMMUNICATION DEVICES OR SYSTEMS

BACKGROUND

The use of mobile communication devices and systems is steadily increasing as a primary method of electronic communication. As the number of mobile communication devices and mobile system accounts increases, more devices are being lost and or/stolen and more system accounts are being accessed by unauthorized users.

Conventionally, service providers have attempted to implement various biometric security measures to prevent the unauthorized use of devices and/or services. For example, some portable computers implement fingerprint scanners for access. Additionally, some telephone service providers have implemented voice recognition and passphrases to access calling card services.

SUMMARY

Currently, when a mobile communication device or system is used by an unauthorized user, the only way to determine that the phone or service is being used is for the owner to monitor the usage records and identify unauthorized usages. However, in many cases these usage records are not immediately available. Furthermore, if the owner has no reason to suspect unauthorized use, the owner may have no reason to monitor the usage. As a result the device and/or service owner may be liable for the unauthorized usage of the device and/or service. Furthermore, any personal information associated with the device and/or service may be compromised.

Systems, methods, and programs are disclosed that detect the unauthorized use of mobile communication devices or systems by sampling the audio transmitted by the device and/or system and comparing the audio sample to an authentic voice profile.

Systems, methods, and programs are disclosed for generating an authorized user profile for a mobile communication device that may sample an audio stream generated by the mobile communication device during communication and may store the audio sample. The systems methods and programs may determine an audio characteristic of the stored audio sample and may create the authorized user profile based on the audio characteristic. Systems, methods, and programs are disclosed for detecting unauthorized use of a mobile communication device that may sample an audio stream generated by the device during communication, may determine an audio characteristic of the audio sample, and may compare the determined audio characteristics of the sample with an authorized user profile.

DETAILED DESCRIPTION OF EXEMPLARY IMPLEMENTATIONS

According to the following examples, mobile communication devices may include, for example, cell phones, Personal Digital Assistants (PDAs), combination devices (e.g., voice and e-mail, internet, gamming, and/or global positing system (GPS)), personal handyphone systems (PHS), satellite telephones, family service radios, citizens' band (CB) radios, family radio service (FRS) radios, general mobile radio service (GMRS) radios, various military frequency radios and communication devices, devices that communicate over wireless networks such as Wi-Fi and WiMAX, and/or any other device capable of transmitting audio communication. Communication services may include, for example, Voice over Internet Protocol (VoIP) accounts and audio messages sent via e-mail.

Figure 1:
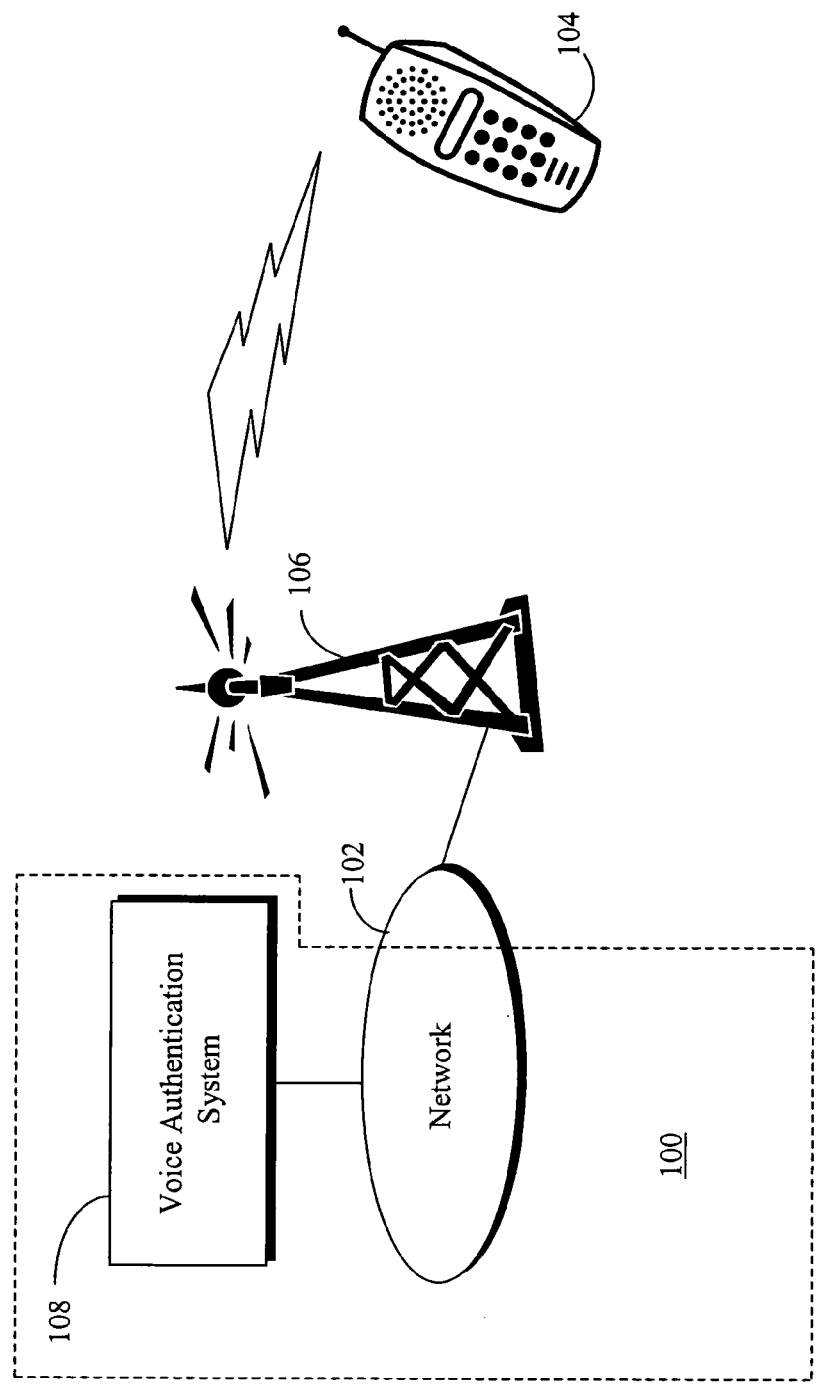
FIG. 1 shows an unauthorized use detection system according to exemplary implementations of the principles described herein.

FIG. 1 shows an exemplary mobile communication system including an unauthorized use detection system 100. For ease of explanation, the system of FIG. 1, will be described in the context of a mobile telephone system. However, the general arrangement is applicable to all mobile devices and communication services. As shown in FIG. 1, the mobile communication system may include, for example, a network 102, a mobile device access point 106 (such as, for example, a cell phone tower), an end-user mobile device 104 (such as, for example a cell phone), and a voice authentication system 108. As shown in FIG. 1, the unauthorized use detection system 100 may include the voice authentication system 108 and all or part of the network 102.

The network may include, for example, a wired or wireless network, such as, for example, one or more of a wired telephone network, a wireless telephone network, a radio network, an intranet, an extranet, a local area network, a wide area network, a storage area network, and/or the Internet. Where the network 102 is a telephone network (wired or wireless) or a large scale computer network such as the Internet, only that portion of the network 102 that receives voice samples and transmits them to and/or between the voice authentication system 108 and/or the end-user mobile device 104 may be part of the system 100. Alternatively, the voice authentication system may be included within the end-user mobile device 104, in which case the network need not be included in the system 100.

It should be appreciated that the end-user mobile device 104 may be wiredly connected to the network 102, such as, for example, a personal computer connected to the Internet. As a result, the end-user device 104 need not itself be mobile. For example, in the case of a VoIP account, the actual device 104 is not mobile, but, for example, a user identifier (such as a PIN, a password, or the like) is mobile such that the account may be accessed from multiple locations. Accordingly, for the purpose of the following examples, such physically non-mobile end-user devices with mobile user identifiers may be considered mobile end-user devices (104) since the location of access is mobile.

In general operation, the voice authentication system 108 may collect one or more audio samples of the primary user of the end-user mobile device 104 and develops an authentic voice profile. The authentic voice profile may be based on one or more audio patterns obtained by evaluating the one or more audio samples of the primary user. Building and using authentic voice profiles may use a commercial technology available today, know as speaker verification technology. The authentic voice profile may also use other characteristics that are not a standard part of current speaker verification technology, and/or new technology developed in the future for verifying the identity of a speaker. The authentic voice profile may include, for example, features based on short-term spectra, inflection patterns, pitch patterns, tone patterns, speed patterns, pause patterns, and/or any other characteristic of the primary users voice. The authentic voice profile need not be tied to the syntax or grammar (i.e., any of the specific words spoken), rather the sample may include one or more characteristics of the manner in which the primary user speaks. In this manner, the authentic voice profile may be language independent and doesn't require a user to speak a particular word in order to evaluate a sample.

In determining the authentic voice profile, various statistical operations may be applied to a number of samples in order to increase the confidence of the authentic sample. For example, the samples could be evaluated to distinguish the primary user of the device 104 from, for example, another person using the device. This may be done, for example, by identifying the various voices associated with the various audio samples (for example, by inflection patterns, pitch patterns, tone patterns, speed patterns, or any other audio characteristic) and determining which voice occurs most frequently. This method of detection is based upon the assumption that the primary user will be represented in the majority of the audio samples taken.

Then, once the primary user is identified, the voice samples of the primary user may be evaluated to develop authentic voice profile. A useable authentic voice profile may be based on as few as one sample, a useable authentic voice profile may be based on a predetermined number of samples, or a developed authentic sample may be considered usable when variations in one or more of the audio characteristics is within predetermined statistical tolerances (e.g., the inflection patterns, pitch patterns, tone patterns, speed patterns, and/or any other audio characteristic patterns of a most recent sample are within a certain standard deviation of the corresponding inflection patterns, pitch patterns, tone patterns, speed patterns, pause patterns, and/or any other audio characteristic patterns of the authentic voice profile).

Once authentic voice profile is determined, the voice authentication system 108 continues to sample audio from the transmissions of the end-user mobile device 104. These subsequent samples, for example, may be taken from each transmission, every predetermined number of transmissions, or at random. The voice authentication system 108 then evaluates one or more of the subsequent samples in a similar manner as above, to extract audio characteristics and compare the extracted audio characteristics with the authentic voice profile to determine if the primary user is a participant in the transmission.

If the primary user is not participant of one or more of the subsequent samples, the voice authentication system 108 may determine that the end-user mobile device 104 is being used by an unauthorized user. This determination may be made based on as few as one subsequent sample. Alternatively the determination may be made if a predetermined percentage of a predetermined number of subsequent samples does not include the primary user.

Based on the determination that the end-user mobile device 104 is being used by an unauthorized user, the device's service may be, for example, suspended and the primary user may be notified by an alternate channel that the device 104 (or password to a service) has been lost or stolen. Furthermore, if the device 104 is equipped with GPS its location may be determined. Alternatively, the device's stationary location may be identified by an IP address. As a result, the unauthorized user's location may be provided to the user and or reported to the police.

Figure 2:
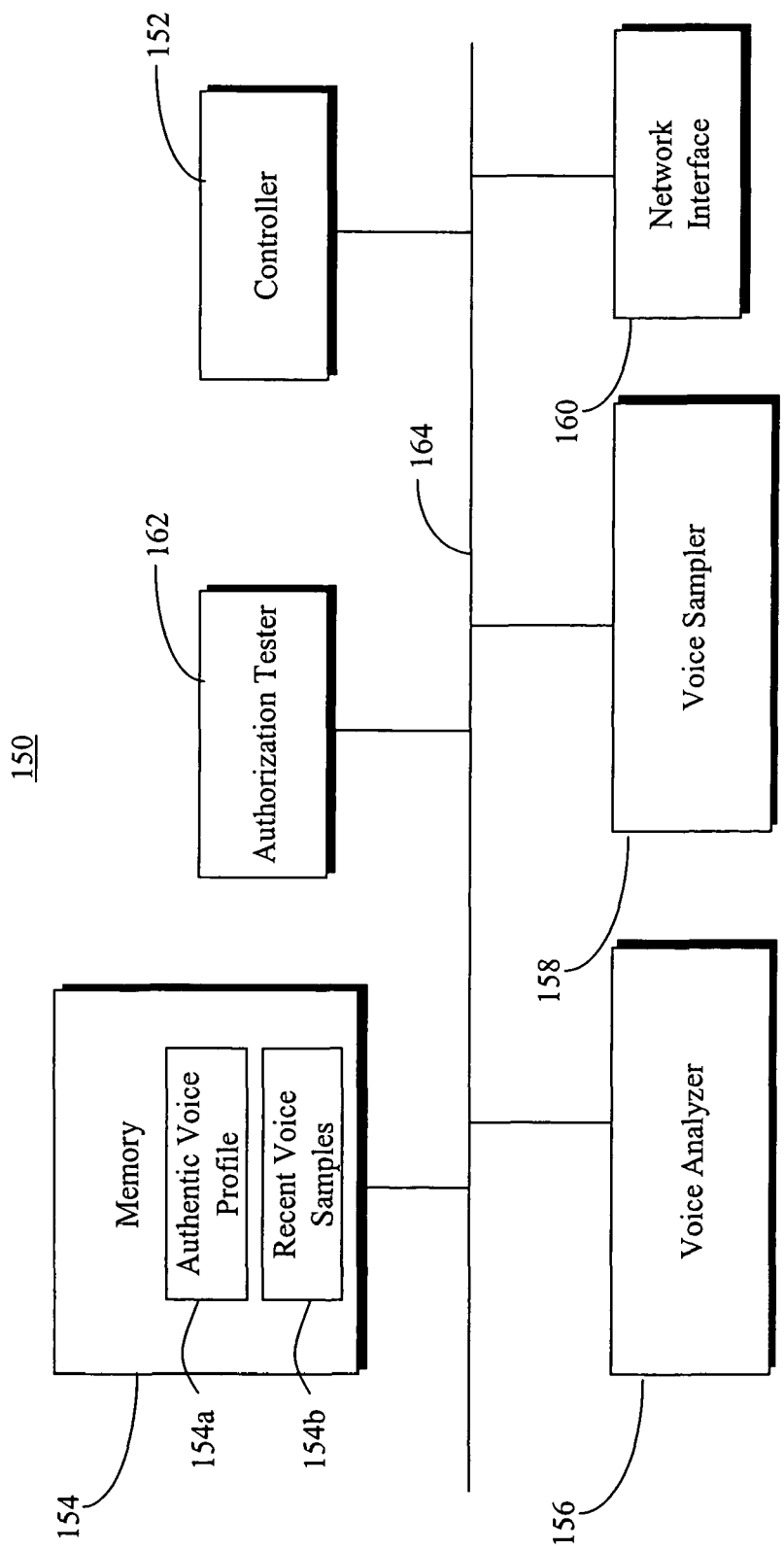
FIG. 2 shows an unauthorized use detection system according to exemplary implementations of the principles described herein.

FIG. 2 shows an exemplary unauthorized use detection system 150. As shown in FIG. 2, the exemplary unauthorized use detection system 150 may physically, functionally, and/or conceptually include, for example, a controller 152, a memory 154, a voice analyzer 156, a voice sampler 158, a network interface 160, and/or an authorization tester 162 each, for example, appropriately interconnected by one or more data/control busses, application programming interfaces, and/or wired or wireless network connections 160. The voice analyzer 156, voice sampler 158, and authorization tester 162 may be implemented using any appropriate combination of circuits, routines, and/or applications and may be appropriately combined into a single circuit routine or application or with or as part of the controller. Further, the voice analyzer 156 and voice sampler 158 may be physically, functionally, or conceptually further divided into multiple circuits, routines, or applications.

While FIG. 2 shows system 150 using a bus architecture, any type of hardware architecture, including wired and wireless networks, may be used based on implementation details. For example, memory 154 and network interface 158 may be individually connected to controller 152. Also, these hardware components may be implemented using any available hardware technology such as FPGA, PAL, application specific integrated circuits (ASICs), etc.

As shown in FIG. 2 the memory may be physically, functionally, and/or conceptually divided into, for example an authentic voice profile portion 154a and/or a recent voice samples portion 154b. The authentic voice profile portion 154a may store audio characteristics of the primary user's authenticated voice samples. The recent voice samples portion 154b may store voice samples from recent usage of the mobile end-user device 104.

The memory 154, shown in FIG. 2, can be implemented using any appropriate combination of alterable memory and/or non-alterable memory. The alterable memory, whether volatile or non-volatile, can be implemented using any one or more of static or dynamic RAM, a removable disk and disk drive, a writeable or re-writeable optical disk and disk drive, a hard drive, and/or flash memory. Similarly, the non-alterable or fixed memory can be implemented using any one or more of ROM, PROM, EPROM, EEPROM, and/or an optical ROM disk, such as CD-ROM or DVD-ROM disk.

The voice analyzer 156 may input a voice sample and determine the sample's various audio characteristics. The voice analyzer 156 may also compare the audio characteristics of one voice sample with the audio characteristics of another voice sample and determine whether the samples are from the same user.

The voice sampler 158 may input an audio stream and extract audio samples representative of the audio stream. The samples may be taken at the beginning of the audio stream. For example, when in the context of a telephone call certain words are commonly used such as "hello," thereby allowing the audio characteristics to be derived from a similar word. However, because the system compares audio characteristics of speech rather than relying on specific words the samples may be taken at any point in the audio stream, irrespective of the words spoken.

The network interface 158 may allow one or more of the elements of the system 150 to communicate with a network, such as for example, network 102.

In general there are two phases of operation of the exemplary unauthorized use detection system 150: the authentic profile preparation phase and the unauthorized use detection phase. During the authentic profile preparation phase, under control of the controller 152, an audio stream associated with the end-user device is input to the voice sampler 158, for example, via the network interface 160. Under control of the controller 152, the voice sampler 158 samples portions of the audio stream and stores the sampled portions in the recent voice samples portion 154*b*. Alternatively, the sampled portions may be input directly into the voice analyzer 156. The voice analyzer 156 accesses the voice samples provided by the voice sampler and determines the audio characteristics of the samples. The determined characteristics, under control of the controller 152, are stored in the authentic voice profile portion 145*a*.

The sampled audio stream may be only that portion of the audio including the device user's voice. For example, only the audio generated by a microphone on the associated end-user device may be included in the audio stream.

Any subsequent audio samples generated from subsequent audio steams may also stored in the recent voice samples portion 154*b* and their determined characteristics may be stored in the authentic voice profile portion 154*a*. The subsequently determined characteristics may be separately stored for each audio stream, or may be used to modify the previously stored profile e.g., to develop a range for each characteristic or a statistically processed range (for example, by ignoring extreme values).

The above process is repeated by the system 150 until it is determined that the audio characteristics stored in the authentic voice profile portion 154*a* are sufficient to identify the authentic user's voice in additional samples. For example, the profile may be considered sufficient when a predetermined number of samples have been collected and analyzed or when the standard deviation of one or more of the stored characteristics is within a predetermined range. If the characteristics were stored separately for each sample, upon the determination that they are sufficient to identify the authorized user, the samples may be reduced to a single authentic voice profile. When the authentic profile is created, the system 150 may enter the second phase of operation.

During the unauthorized use detection phase, audio streams collected from the end-user mobile device and representing a user's voice are input, under control of the controller 152, to the voice sampler 158. Under control of the controller 152, the voice sampler 158 samples the audio stream and stores at least one sample in the recent voice samples portion 154*b*. Alternatively, the at least one sample may be input directly to the voice analyzer 156. Under control of the controller, the voice analyzer 156 inputs a recent sample and the authentic voice profile and compares the characteristics of the recent sample to the characteristics of the authentic voice profile. Under control of the controller 152, the voice analyzer 156 determines whether the recent sample contains the authorized user's voice by comparing the recent sample with the authentic voice profile. If the voice analyzer 156 determines that the recent sample is not the authorized user, under control of the controller 152, the sample is stored in the recent voice samples portion 154*b* with an indication that the sample is not the authorized user. Alternatively, simply the indication of whether the sample is the authorized user may be saved, and the sample itself discarded. If the voice analyzer 156 determines that the recent sample is the authorized user, under control of the controller 152, the sample and/or indication the sample is the authorized user is stored in the recent voice samples portion 154*b*.

When, for example, a certain number of samples have been evaluated and the indications have been stored in the recent voice samples portion 152*b*, or a certain amount of time has passed, under control of the controller 152, the authorized usage tester 162 accesses the stored voice sample indications and determine whether the authorized user has been the primary user of the mobile end-user device 104. The determination may be made based on, for example, whether a percentage of the stored indications that indicate a sample has been determined to be someone other than the authorized user exceeds a predetermined limit. Under control of the controller 152, the determination may be output for use by, for example, a service provider.

It should be appreciated that, according to the above example, the system may continually monitor the usage tester may continually monitor the stored information after each sample is evaluated (i.e, the certain number of samples to be evaluated is one), and make a decision after each sample.

Figure 3:
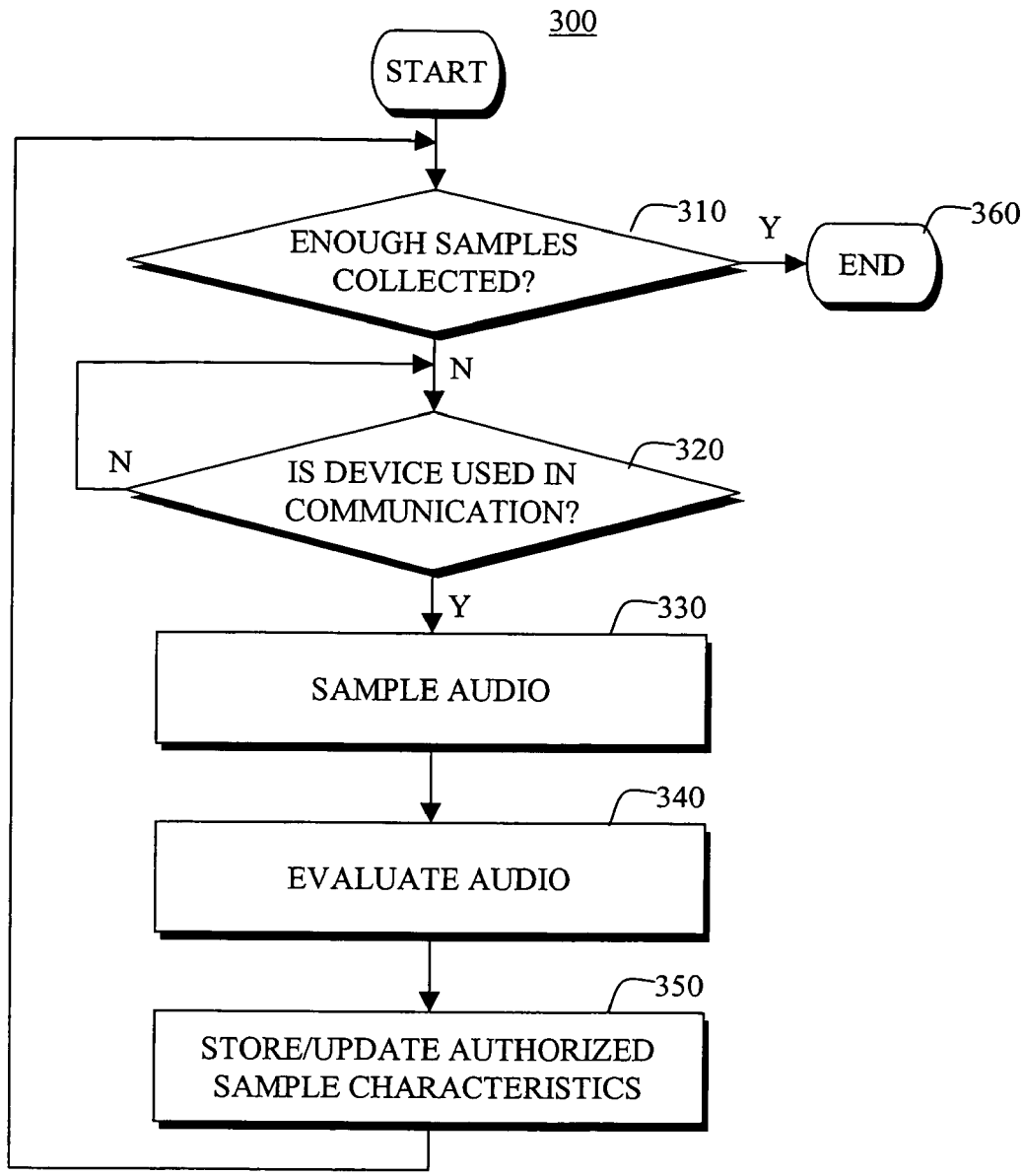
FIG. 3 shows a method for developing an authentic voice profile according to exemplary implementations of the principles described herein.

One example of an exemplary method 300 for developing an authorized user profile is shown in FIG. 3. The exemplary method may be implemented, for example, by one or more components of the above-described systems 100, 150. However, even though the exemplary structure of the above-described systems may be referenced in the description of the method, it should be appreciated that the referenced structure is exemplary and the exemplary method need not be limited by any of the above-described exemplary structure.

As shown in FIG. 3, in step 310 it is determined whether enough audio samples have been collected. If enough samples have been collected, the authorized profile may be considered complete, and in step 360 operation ends. If enough samples have not been collected, operation continues to step 320. The determination of whether enough samples may be made, for example, based on the total number of samples, an elapsed time, or whether one or more characteristics of all of the collected samples is within a particular standard deviation. In step 320, it is determined whether the device is being used in communication. Once the device is being used in communication, operation continues to step 330.

In step 330, an audio sample is taken from the device's current communication. For example, a portion of the audio received from the device's microphone (i.e., the voice of the user of the device rather than the other party) is sampled. Then, in step 340, the audio sample is evaluated to determine the audio characteristics of the user's voice. Next, in step 350, the audio characteristics determined from the sample are, for example, stored to create an authorized voice profile or used to update an existing authorized user profile. Operation of the method returns to step 310 and repeats until enough samples have been collected.

Figure 4:
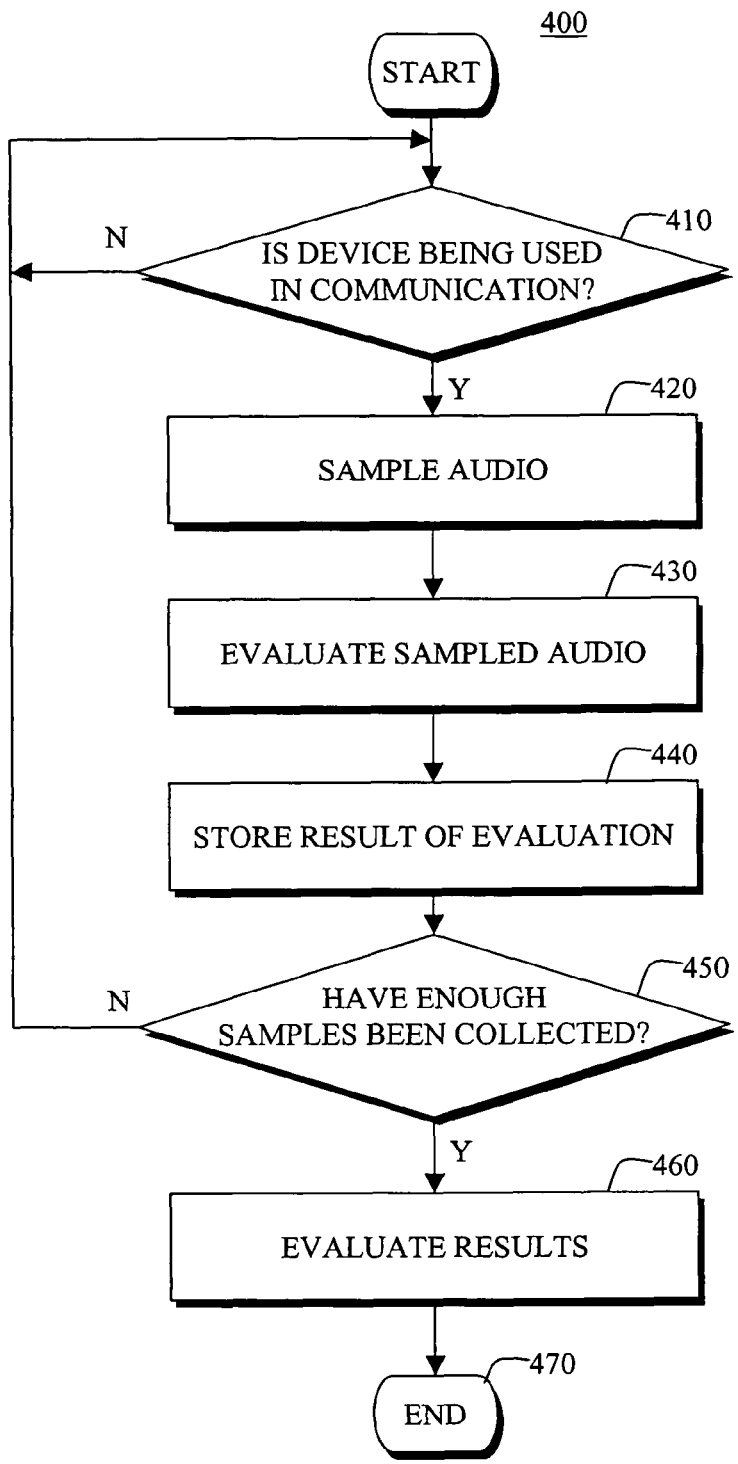
FIG. 4 shows a method of evaluating messages according to exemplary implementations of the principles described herein.

One example of an exemplary method 400 for evaluating messages is shown in FIG. 4. The exemplary method may be implemented, for example, by one or more components of the above-described systems 100, 150. However, even though the exemplary structure of the above-described systems may be referenced in the description of the method, it should be appreciated that the referenced structure is exemplary and the exemplary method need not be limited by any of the above-described exemplary structure.

As shown in FIG. 4, the method begins in step 410 where it is determined whether an end-user mobile device is being used in communication. Once the device is being used in communication, in step 420, a portion of the communicated audio is sampled. Again, for example, the audio may be the audio originating the microphone of the device to ensure that the device user's voice is being sampled rather than another party involved in the communication. Operation continues to step 430.

In step 430, the sampled audio is evaluated to determine its audio characteristics. Then, in step 440, the audio characteristics of the sample may be stored. In step 450, it is determined whether enough samples have been evaluated and their audio characteristics stored. For example, this determination may be made on the total number of samples, or an amount of time that has elapsed since a previous evaluation of stored audio characteristics. If enough samples have not been collected, operation returns to step 410. If enough samples have been collected, operation continues to step 460, where the stored audio characteristics are compared with the authorized user's profile.

For example, each sample's audio characteristics may be compared with the authorized user's profile to determine whether the sample, and thus the associated communication, was made by the authorized user. The comparison may be made within certain statistical tolerances, for example, based on the reliability of the authorized user profile. For example, if the authorized user profile is rather new, that is, based on only a few samples, then the comparison may allow for a larger deviation form the profile to be considered a match. Similarly, if the authorized user profile is based on many samples, then the comparison may only allow for a smaller or no deviation from the profile to be considered a match.

Then, the total number of stored characteristics of samples is evaluated to determine, for example, what percentage of the total number of samples represent communications by the authorized user. If a predetermined percentage of the samples do not include the authorized user, then it may be determined that someone other than the authorized user is using the mobile end-user device. In step 470, operation of the method ends.

It should be appreciated that according to the above example, once the stored samples and/or indications are evaluated, they may be discarded in order for another group of samples and/or indications to be collected. Alternatively, upon evaluation only the oldest sample and/or indication may be discarded. Then once the next sample and/or indication is obtained and evaluated the stored samples and/or indications may be evaluated, in effect creating an oldest out, newest in, rolling group of samples and/or indications.

It should also be appreciated that according to the above example, the order of the steps is not strict, for example, the samples may each be evaluated prior to being stored.

As a result of the above exemplary systems, methods, and programs it is possible to determine the likelihood that a mobile end-user device is not being used by the primary authorized user. Thus, when it is determined that the mobile end-user device is not being used by the primary authorized user, the primary authorized user and/or the police may be notified and/or provided with the location of the device if it is equipped with a GPS receiver.

However, it is possible that a mobile end-user device 104 may have more than one authorized user. For example, it is possible that a spouse, sibling, friend, co-worker, etc. may use the phone and the primary user may not want to be notified of their use. Accordingly, exemplary systems and methods may allow a second or subsequent user to be considered an authorized user of the mobile end-user device 104. For example, a second user authorization mode may be provided in which the second or subsequent user may actively provide voice samples that will be used to create a second authorized user profile. Alternatively, upon notification that there will be a second user, the device may attempt to evaluate each sample that is obtained and, based on the samples' audio characteristics, group the samples by user. Then, based on the grouped samples, individual audio profiles may be provided for each user. Thus, according to each exemplary process any number of users may be registered as authorized users.

It is also possible that the performance of speaker verification can be denigrated by changes in the environment in which the mobile device is being used. For example, a user may add a headset and remote microphone to his existing cell phone, or purchase a new cell phone handset for his account. It is also possible that multiple voice coders can be associated with a single device. For example, 3G cellular networks may have variable rate coders, and VoIP services may offer a variety of selectable coders. Changes such as these may alter the condition of the voice collection or transmission sufficiently to cause authentic users to be regularly identified as impostors.

Accordingly, exemplary systems and methods may allow a user to update his voice profile. Alternatively, the authorization system may automatically detect the state of characteristics such as the coder, the cell phone model, or the presence of a headset. If the condition is a new one not encountered before, the authorization system may update the voice profile to reflect the new conditions. If the condition is already reflected in the voice profile, the authorization tester can use this information as part of its testing process. For example, the Detection System may keep two versions of a voice profile, one for each of two voice coders. The Authorization Tester would use the version that matched the conditions of the current call.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A method for generating an authorized user profile for a mobile communication device, comprising:
    sampling an audio stream generated by the mobile communication device during a telephone call between at least two parties;
    storing an audio sample of the audio stream;
    determining audio characteristics of the audio sample stored including short-term spectra, speed patterns, and pause patterns;
    creating the authorized user profile based on the audio characteristics when variation in the audio characteristics are within predetermined statistical tolerances;
    determining a reliability tolerance of the authorized user profile based on a number indicative of a total number of audio samples, the reliability tolerance indicating an amount a particular audio sample can deviate from the authorized profile and be identified as containing an authorized user's voice;
    updating the authorized user profile and the reliability tolerance based on a subsequent audio sample received during use of the mobile communication device in a communication;
    storing a second audio sample generated by the mobile communication device during communication;
    determining an audio characteristic of the second audio sample stored;
    creating a second authorized user profile based on the audio characteristic of the second sample stored; and distinguishing the second audio sample from the audio sample stored by comparing the audio characteristics of the audio sample stored with the audio characteristic of the second audio sample.

2. The method of claim 1, further comprising:
creating the authorized user profile based on audio characteristics of two or more stored audio samples.

3. The method of claim 1, wherein the mobile communication device is a cellular telephone.

4. The method of claim 1, wherein the mobile communication device comprises a computer with voice over internet protocol capability, the computer requiring access to the voice over internet protocol capability with a user identifier.

5. The method of claim 1, wherein the audio characteristics further comprise one of features based on tone patterns, pitch patterns, and inflection patterns.

6. A system for detecting unauthorized use of a mobile communication device comprising:
a processor configured to:
sample an audio stream generated by the mobile communication device during a telephone call between at least two parties to create a first audio sample of the audio stream;
store the first audio sample of the audio stream;
determine audio characteristics of the first audio sample stored including short-term spectra, speed patterns and pause patterns;
create an authorized user profile based on the audio characteristics of the first audio sample stored when variation in the audio characteristics of the first audio sample stored are within predetermined statistical tolerances;
determine a reliability of the authorized user profile based on a number indicative of a total number of audio samples and indicating an amount a particular audio sample can deviate from the authorized profile and be considered a match;
sample an audio stream generated by the device during communication to create a second audio sample of the audio stream;
determine an audio characteristic of the second audio sample;
compare the determined audio characteristic of the second audio sample with the authorized user profile; and
update the authorized user profile and the reliability tolerance based on a subsequent audio sample received during use of the mobile communication device in a communication;
storing a third audio sample generated by the mobile communication device during communication;
determining an audio characteristic of the third audio sample stored;
creating a second authorized user profile based on the audio characteristic of the third sample stored; and
distinguishing the third audio sample from the first audio sample stored by comparing the audio characteristics of the first audio sample stored with the audio characteristic of the third audio sample.

7. A cellular telephone system comprising the system of claim 6.

8. A cellular telephone comprising the system of claim 6.

* * * * *